(12) United States Patent
Marin et al.

(10) Patent No.: US 10,496,372 B2
(45) Date of Patent: Dec. 3, 2019

(54) ELECTRONIC CALCULATING DEVICE FOR PERFORMING OBFUSCATED ARITHMETIC

(71) Applicant: KONINKLIJKE PHILIPS N.V., Eindhoven (NL)

(72) Inventors: Leandro Marin, Eindhoven (NL); Alphons Antonius Maria Lambertus Bruekers, Nederweert (NL); Paulus Mathias Hubertus Mechtildis Antonius Gorissen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/515,391

(22) PCT Filed: Sep. 30, 2015

(86) PCT No.: PCT/EP2015/072635
§ 371 (c)(1),
(2) Date: Mar. 29, 2017

(87) PCT Pub. No.: WO2016/050884
PCT Pub. Date: Apr. 7, 2016

(65) Prior Publication Data
US 2017/0220320 A1    Aug. 3, 2017

(30) Foreign Application Priority Data

Sep. 30, 2014  (EP) .................................... 14186951

(51) Int. Cl.
*G06F 7/72*    (2006.01)
*G06F 7/523*   (2006.01)
(Continued)

(52) U.S. Cl.
CPC ............... *G06F 7/523* (2013.01); *G06F 7/50* (2013.01); *G06F 7/72* (2013.01); *G06F 7/724* (2013.01);
(Continued)

(58) Field of Classification Search
CPC . G06F 7/72; G06F 7/724; G06F 7/727; G06F 7/729; H04L 2209/16
See application file for complete search history.

(56) References Cited

U.S. PATENT DOCUMENTS 1,418,394 A    11/1983  Tai
4,949,294 A *   8/1990  Wambergue ............ G06F 7/729
                                                      708/491

(Continued)

FOREIGN PATENT DOCUMENTS

EP       1876577 A1    1/2008
JP    2011513787 A    4/2011

(Continued)

OTHER PUBLICATIONS

Chow et al: "White-Box Cryptography and an AED Implementation"; LNCS 2595, 2003, pp. 250-270.

(Continued)

*Primary Examiner* — Matthew D Sandifer (57) ABSTRACT

An electronic calculating device for performing arithmetic in a commutative ring includes a storage configured to store an increment table defined for an increment ring element, the increment table mapping an input ring element to an output integer-list encoding an output ring element, such that the output ring element equals the increment ring element ring-added to the input ring element. Using the increment table, a ring addition unit adds a first addition-input integer-list encoding a first addition-input ring element and a second addition-input integer list encoding a second addition-input ring element. The device may include a ring multiplication unit also using the increment table.

17 Claims, 5 Drawing Sheets

(51) Int. Cl.
*H04L 9/06* (2006.01)
*G06F 7/50* (2006.01)

(52) U.S. Cl.
CPC ........ *H04L 9/0618* (2013.01); *H04L 2209/16* (2013.01)

(56) References Cited

U.S. PATENT DOCUMENTS

| | | | |
|---|---|---|---|
| 5,069,547 | A | 12/1991 | Huggins et al. |
| 5,270,956 | A | 12/1993 | Oruc et al. |
| 6,760,742 | B1 | 7/2004 | Hoyle |
| 7,434,898 | B2 | 10/2008 | Futa et al. |
| 8,595,513 | B2 | 11/2013 | Adjedj |
| 8,670,559 | B2 | 3/2014 | Michiels et al. |
| 9,288,039 | B1 | 3/2016 | Monet et al. |
| 2003/0044004 | A1 | 3/2003 | Blakley et al. |
| 2004/0139340 | A1 | 7/2004 | Johnson et al. |
| 2005/0002532 | A1 | 1/2005 | Zhou et al. |
| 2007/0126049 | A1 | 6/2007 | Moharir et al. |
| 2008/0069345 | A1 | 3/2008 | Rubin |
| 2008/0208560 | A1 | 8/2008 | Johnson et al. |
| 2009/0228717 | A1 | 9/2009 | Futa et al. |
| 2011/0010141 | A1* | 1/2011 | Jabir ................ G06F 17/5045 703/2 |
| 2011/0246787 | A1 | 10/2011 | Farrugia et al. |
| 2013/0329883 | A1 | 12/2013 | Tamayo-Rios |
| 2014/0006605 | A1 | 1/2014 | Frei et al. |
| 2014/0095772 | A1 | 4/2014 | Lee et al. |
| 2015/0067874 | A1 | 3/2015 | Johnson et al. |
| 2015/0186627 | A1* | 7/2015 | Teuwen ............... G06F 21/14 713/190 |
| 2015/0215123 | A1 | 7/2015 | Kipnis et al. |
| 2017/0109539 | A1 | 4/2017 | Kinasz |
| 2017/0220320 | A1 | 8/2017 | Marin et al. |
| 2017/0324544 | A1 | 11/2017 | Marin et al. |

FOREIGN PATENT DOCUMENTS

| | | |
|---|---|---|
| JP | 2012129993 A | 7/2012 |
| WO | 2004112307 A2 | 12/2004 |
| WO | 2006117769 A2 | 11/2006 |
| WO | 2009076669 A1 | 6/2009 |
| WO | 2014016795 A2 | 1/2014 |
| WO | 2016050884 A1 | 4/2016 |

OTHER PUBLICATIONS

Zhu et al: "A Provable Scheme for Homomorphic Obfuscations in Software Security"; Proceedings of the IASTED International Conference on Communication, Network, and Information Security, Jan. 2006, pp. 1-5.

Aspire Advanced Software Protection: Integration, Research and Exploitation; "Early White-Box Cryptography and Data Obfuscation Report"; Project No. 609734, Oct. 2014, 64 Page Document.

Dardaillon et al: "Hardware Implementation of the GPS Authentication"; IEEE 2012, pp. 1-6.

Kerl: "Computation in Finite Fields"; Arizona State University and Lockheed Martin Corporation, Apr. 2004, 90 Page Document.

Wikipedia; "Lattice Multiplication" Document Downloaded From https://en.wikipedia.org/wiki/Lattice_multiplication, last updated on Apr. 24, 2017, 3 page document.

Omondi et al: "Residue Number Systems, Theory and Implemention"; Advances in Computer Science and Engineering:Tests, vol. 2, Published by Imperial College Press, 2007.

* cited by examiner

ELECTRONIC CALCULATING DEVICE FOR PERFORMING OBFUSCATED ARITHMETIC

CROSS-REFERENCE TO PRIOR APPLICATIONS

This application is the U.S. National Phase application under 35 U.S.C. § 371 of International Application No. PCT/EP2015/072635, filed on Sep. 30, 2015, which claims the benefit of or European Patent Application No. 14186951.1, filed on Sep. 30, 2014 These applications are hereby incorporated by reference herein.

FIELD OF THE INVENTION

The invention relates to electronic calculating device, a ring encoding device, a ring decoding device, a table computation device, an electronic calculating method, a computer program, and a computer readable medium.

BACKGROUND

In white-box cryptography and more in general software obfuscation, computations are often performed on encoded values instead of plain values. Reverse engineering of the obfuscated software is harder if computations are performed on encoded values, instead of on the plain values themselves.

After the encoding, regular operations, like addition or multiplication, can no longer be performed using a computer's built-in primitives. The straightforward addition of encoded values does not normally result in the encoding of the addition of the values. The same holds for multiplication. In a formula: $E(x)+E(y) \neq E(x+y)$, for most x and y; E denotes the encoding function.

A solution to this problem is to introduce addition (A) and multiplication (M) tables. The tables take two encoded values as input and produce an encoded value as output that corresponds to the encoding of the addition or multiplication operation. The tables may be defined as: $A(E(x), E(y))=E(x+y)$; $M(E(x), E(y))=E(xy)$. These tables allow arithmetic to be performed directly on encoded values.

The obfuscated addition and multiplication using tables suffers from at least two drawbacks. First, the tables can become quite large. If x and y are represented as/bits, each table needs $2^{2l}$ l bits.

Second, such large tables may be easily found in software. Worse, the tables might still be identified as addition or multiplication operations even though they are encoded; for example, through properties of these functions that are preserved in the encoding. For example, the multiplication table satisfies $M(E(0), E(x))=E(0)$. An attacker may use this and similar properties to guess which operation the tables represent.

SUMMARY OF THE INVENTION

It would be advantageous to have an improved way to perform obfuscated arithmetic. A calculating device as defined in the claims is provided.

The inventors found that in some cases multiplication and addition on encoded values may be performed using a single table without having to encode multiple values into a single encoded value. Because the same table is used for addition and multiplication it would be hard to see during reverse engineering if an addition or a multiplication is performed. Because addition and multiplication appear to be the same operation when viewed from the outside, the inventors have termed this method 'homogenous obfuscation'. Even if an attacker were able to find the table that is used, and even if he were able to figure out somehow its function as an increment table, he still would not know whether addition or multiplication operations are performed. The way the table acts on element of the integers list, will differ for addition and multiplication, however this may be easily hidden using traditional obfuscation, such as a code obfuscation, white-box implementation, etc.

In addition, the single table that is used is also smaller than the one discussed in the background: approximately $2^l$ l bits are needed. Even if only addition is used, the table needed for obfuscated addition is smaller than the table suggested in the background.

The invention applies to many different commutative rings R, although not each and every ring allows encoding as integer lists. Commutative rings are a mathematical concept that includes many different familiar mathematical structures, e.g., the integers modulo a number ($\mathbb{Z}_n$) or the polynomials modulo a number and a polynomial ($\mathbb{Z}_n[x]/f(x)$). Fields are a special case of commutative rings. As will be described herein the skilled person can verify if a given ring allows the obfuscation.

For example, a ring element may be encoded as two integers (a, b). Arithmetic can be performed directly on the encoding using an increment table that maps an encoded ring element to the encoded ring element plus an increment value. For example, the table may map (a, b) to (c, d) if $u^c - u^d = u^a - u^b + 1$. Both the addition and multiplication are performed by repeated applications of the increment table.

As will be discussed more fully herein, there are many other possibilities and variants. It will be typically unknown to an attacker which one of many variants has been chosen in any given implementation.

The calculating device is an electronic device and may be a mobile electronic device, e.g., a mobile phone, a set-top box, a computer, a smart card, etc.

Obfuscated arithmetic as described herein may be applied in a wide range of practical applications. Such practical applications include secure applications running on private hardware, e.g., banking applications etc, wherein reverse engineering is to be prevented. Other applications include applications wherein inadvertent leaking of data is to be prevented. If a program is tricked into releasing private data this is less of a concern if the leaked data is encoded. Obfuscated arithmetic may also be applied to servers running applications. Privacy is increased if users send and receive data in encoded form.

A method according to the invention may be implemented on a computer as a computer implemented method, or in dedicated hardware, or in a combination of both. Executable code or parts thereof for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings, FIG. 1a schematically shows an example of an embodiment of a calculating device 100, FIG. 1b schematically shows an example of an embodiment of a ring addition unit 130, FIG. 1c schematically shows an example of an embodiment of a ring multiplication unit 140, FIG. 2 schematically shows an example of an embodiment of a calculating device 101, FIG. 3 schematically shows an example of an embodiment of a table computation device 200 for computing an increment table for use in a calculating device, FIG. 4 schematically shows an example of an embodiment of a calculating method 30 for performing obfuscated arithmetic, FIG. 5 schematically shows an example of an embodiment of an addition method 400, FIG. 6 schematically shows an example of an embodiment of a multiplication method 500.

Items which have the same reference numbers in different figures, have the same structural features and the same functions, or are the same signals. Where the function and/or structure of such an item has been explained, there is no necessity for repeated explanation thereof in the detailed description.

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In the following, for sake of understanding, elements of embodiments are described in operation. However, it will be apparent that the respective elements are arranged to perform the functions being described as performed by them.

The electronic calculating device performs efficient arithmetic using surprisingly small tables. Moreover, in the art of obfuscated arithmetic it is considered an advantage if an operation can be performed through a table, as such operations may be easily obfuscated further, e.g., using traditional white-box techniques (see, e.g., Chow et al, "White-box cryptography and an AES implementation"). There is thus a need to express arithmetic operations using tables. Embodiments implement addition using a smaller table than is done in the prior art. Even without additional obfuscation such as white-box cryptography, the electronic calculating device contributes to obfuscation. As is shown herein there are many ways in which the encoding and increment table may be implemented. Which encoding is used in any particular embodiment is unknown to an attacker and thus makes an observed calculation harder to interpret.

Embodiments allow multiplication and addition operations to be performed using the same table. This further adds to obfuscation, since from the fact that the increment table is used, one can no longer determine what operation is performed. Below, first a number of possible architectures of embodiments of calculating devices are discussed. Next, a number of alternative ways to perform obfuscated arithmetic are discussed.

Figure 1A:
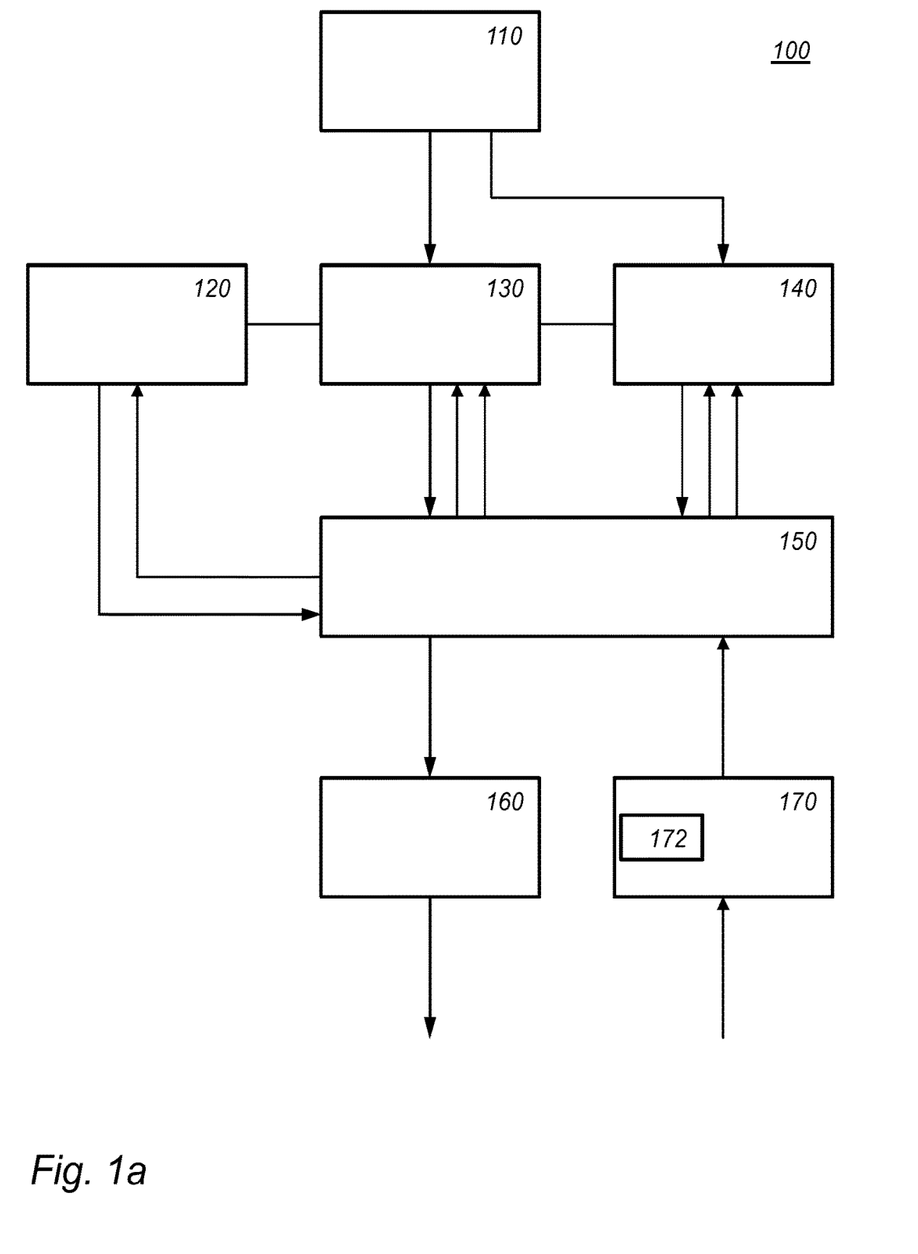

FIG. 1 schematically shows an example of an embodiment of a calculating device 100. Calculating device 100 is an electronic device for performing obfuscated arithmetic in a finite commutative ring. Many examples of commutative rings are known. Below examples are given for two such rings: the integers modulo a number ($\mathbb{Z}_n$) and the polynomials modulo a number and a polynomial ($\mathbb{Z}_n[x]/f(x)$). Other embodiment may use other commutative rings.

The elements of the ring are referred to as ring elements. On the ring elements an addition and a multiplication is defined, the latter are referred to as the ring-addition and the ring-multiplication.

Ring elements may be represented in any suitable form, should that be needed. For example, elements of $\mathbb{Z}_n$ may be represented as integers; elements of $\mathbb{Z}_n[x]/f(x)$ as polynomials. However, in calculation device 100, ring elements are represented as integer-lists. For example, a ring element a may be represented in calculation device 100 by a list $(a_1, a_2)$. The latter even holds for non-integer rings, say polynomial rings. An integer-lists encodes a ring-element according to some mapping between ring elements and integers list; given any ring-element there is at least one integer list that represents the ring-element, and given any integer list, there is exactly one ring element that it represents. In embodiments any ring element may be represented as an integer list.

The integer lists have at least two elements. As it turns out, the addition and multiplication operations require fewer steps if the integer list is shorter. Accordingly, in an embodiment the integer lists always have two elements. In the main description we will assume that the integer lists are integer pairs, however, examples of integer lists having more than two elements are provided. As an example, the $(a_1, a_2)$ may map to the ring element $(u^{a_1} - u^{a_2})$, wherein u is a special ring element, referred to as a base ring element. Many variants are discussed below, including using multiple base elements. However in the main discussion we will assume as 'the example encoding' that a given integer list $(a_1, a_2)$ maps to the ring element $(u^{a_1} - u^{a_2})$.

In an embodiment, the integers in an integers list are non-negative. This simplifies the computation, but is not necessary. Furthermore, in an embodiment, the integers in the integer list are taken modulo the order of a base element. The order of a base element u is the smallest integer k such that $u^k=1$. It is convenient to keep the values in an integer list in the range [0, k-1], e.g., by performing modulo k operations.

Calculation device 100 may comprise an operand store 150. Operands are stored as integer lists in operand store 150. Arithmetic may be performed on operands stored in operand store 150. Results of said arithmetic may be stored in operand store 150, where they may be used in new operations, or may be output to a different device, etc.

Calculation device 100 comprises a storage 110 arranged to store an increment table T defined for an increment ring element. The increment table maps an input ring element to an output integer-list encoding an output ring element, such that the output ring element equals the increment ring element ring-added to the input ring element. In an embodiment, the input ring element is represented as an integer list. In this way, table T maps integer lists to integer lists; both according to the same encoding, e.g. the same mapping.

However, there are embodiments in which the input ring element is represented as an integer list in an alternative encoding. In any case, the input ring element is represented in digital form, allowing the table to map the input ring element to an output ring element.

The table may list input ring elements, in some format, together with the associated output integer list. The table may also be represented in storage by omitting the input ring and only listing the output integer lists. For example, this may be done if the input ring is represented in a canonical format.

For example, assuming the example encoding, the input ring element $k=u^{k_1}-u^{k_2}$ may be mapped by table T to an output integer-list. In this case, the input ring element may be represented as an integer list, so that we may have $((k_1, k_2))=(l_1, l_2)$. The latter encodes an output ring element $l=u^{l_1}-u^{l_2}$. The output ring element equals the increment ring element ring-added to the input ring element. For example, if the increment ring element is 1, then $l=k+1$. In an embodiment, the increment element may be 1, however this is not needed. For example, using the example encoding, the increment element may be chosen as $u^t$ for some value of t, e.g., any value $0<=t<\text{order}(u)$.

The increment table is much smaller than the tables described in the background. The latter tables take two inputs, e.g., two encoded numbers to produce an encoded output. However, the table T takes only one encoded input to produce one encoded output; the increment ring element is fixed. Assuming the encodings take a similar amount of space, the input space of T is reduced to about the square root. This is a significant size improvement.

Calculation device 100 comprises a ring addition unit 130 and a ring multiplication unit 140. Calculation device 100 may also comprise a ring negation unit 120. In an embodiment, the ring multiplication unit 140 may use addition unit 130 to perform additions; addition unit 130 may use negating unit 120. This has been indicated in FIG. 1 by lines between unit 120, 130 and 140. However, units may be duplicated; for example, addition unit 130 may do its own negation, and multiplication 140 may do its own addition. Negation is also referred to as 'change of sign'.

Negation unit 120 may receive a negation-input integer list $(a_1, a_2)$ encoding a negation-input ring element a. Negation unit 120 is arranged to determine an negation output integer list $(b_1, b_2)$ encoding a negation-output ring element b. The negation output ring element is the negative of the negation input ring element, e.g., the negation output ring element equals the neutral ring element for the addition (0) minus the negation input ring element. Thus $b=-a$.

In an embodiment, the negation unit may compute the output integer list by permuting the negation input integer list. Using the example encoding, $a=u^{a_1}-u^{a_2}$, the output integer list may be $(a_2, a_1)$. Negating by permutation may be efficiently implemented in code by changing the address from which an element is read, and it does not necessarily change the actual order in memory.

In an embodiment, the negation unit may compute the output integer list by adding a constant to each integer of the integer list. For example, in the example encoding using an integer m such that $u^m=-1$; for example the output integer list may be $(a_1+m, a_2+m)$.

Ring addition unit 130 is arranged to receive a first addition-input integer-list $(a_1, a_2)$ encoding a first addition-input ring element and a second addition-input integer list $(b_1, b_2)$ encoding a second addition-input ring element. For example, ring addition unit 130 may receive the two operands from operand store 150. Ring addition unit 130 is arranged to determine an addition-output integer-list encoding an addition-output ring element by applying the increment table to ring elements determined from the first and second addition-input integer-lists, the addition-output ring element being equal to the ring-addition of the first addition-input ring element and the second addition-input ring element.

In an embodiment, the mapping of an integer list to a particular ring element comprises multiple sub-mapping, each sub-mapping being associated with an integer of the integer list, a sub-mapping mapping an integer to a ring element. The mapping is a linear combination, e.g., a sum, of the sub-mappings applied to the associated integer. A sub-mapping may be raising a base element to a power determined by the associated integer. For example, in the example encoding, $(a_1, a_2)$ may be said to a sum of the sub-mappings $u^{a_1}$ and $-u^{a_2}$.

Figure 1B:
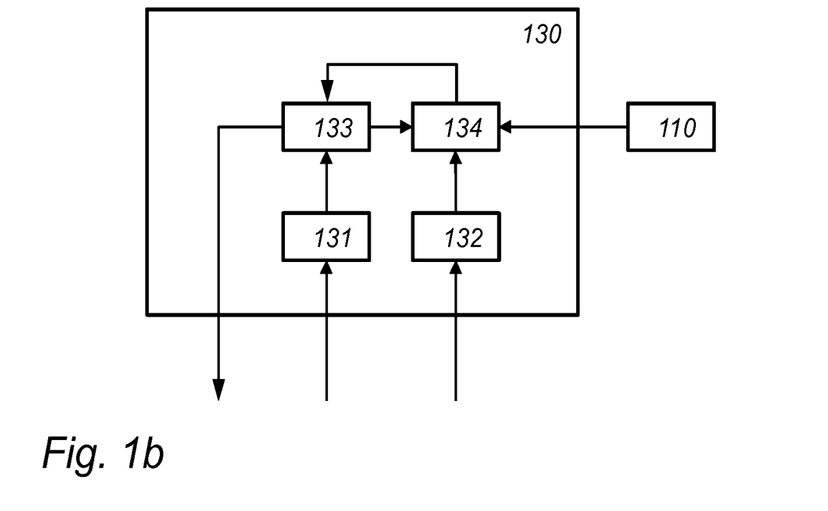

FIG. 1b illustrates an embodiment of addition unit 130. Addition unit 130 receives a first addition input integer list 131, and a second addition-input integer list 132. Addition unit 130 comprises an intermediate addition unit 134 arranged to iteratively add a ring element obtained from an integer of the second addition input integer list 132 to the first addition-input ring element. For example, the intermediate addition unit 134 may add to an intermediate sum 133 which is initialized to the first integer list element. The addition involves an application of the increment table from storage 110.

Ring multiplication unit 140 is arranged to receive a first multiplication-input integer-list $(r_1, r_2)$ encoding a first multiplication-input ring element and a second multiplication-input integer list $(s_1, s_2)$ encoding a second multiplication-input ring element. For example, multiplication unit 140 may receive two operands from operand store 150. Ring multiplication unit 140 is arranged to determine a multiplication-output integer-list encoding a multiplication-output ring element by applying the increment table to ring elements determined from the first and second multiplication-input integer-lists, the multiplication-output ring element being equal to the ring-multiplication of the first multiplication-input ring element and the second multiplication-input ring element.

Figure 1C:
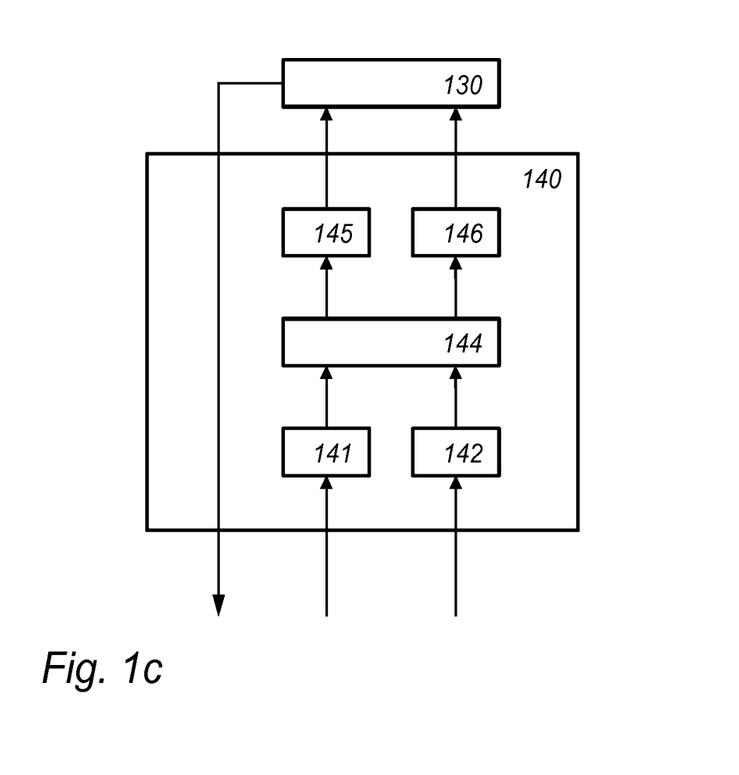

FIG. 1c shows a possible embodiment of multiplication unit 140. Multiplication unit 140 receives a first multiplication-input integer-lists 141 and a second multiplication-input integer-lists 142. Multiplication unit 140 comprises an intermediate multiplication unit 144 arranged to determine from the first and second multiplication-input integer-lists 141, 142 a first intermediate multiplication integer-list 145 $(t_1, t_2)$ and a second intermediate multiplication integer-list 146, $(u_1, u_2)$, encoding a first and second intermediate multiplication ring element respectively. The multiplication unit 140 is arranged to add the first 145 and second intermediate multiplication integer-list 146 through the ring addition unit 130. Determining the intermediate integer list may involve arithmetic operations on the integers in the integer list, but does not require the increment table.

Calculation device 100 optionally comprise a ring encoding unit 170 for encoding a ring element of the commutative ring as an integer list, and a ring decoding unit 160 for decoding an integer-list (a, b) to a ring element (x) of the commutative ring. Encoding unit 170 and/or decoding unit 160 may be absent, e.g., when calculating device 100 receives encoded input and/or reports in encoded output. Encoding unit 170 and/or decoding unit 160 may be implemented as a standalone unit, e.g., as encoding device and/or decoding device 160.

The ring encoding unit 170 may comprise a storage 172 arranged to store an encoding table defined for one or more base ring elements (u), the encoding table mapping the ring element (x) to an integer-list ((a, b)) such that the ring element equals a linear combination of powers of the one or more base ring elements ($x=u^a-u^b$), wherein the powers have exponents determined by the integer-list. Encoding unit 170 may store the encoded ring element in operator store 150. Encoding unit 170 allows the system to work with plain information.

The ring decoding unit 160 is arranged to determine for one or more base ring element (u), the ring element (x) such that the ring element equals a linear combination of powers of one or more base ring element ($x=u^a-u^b$), wherein the powers have exponents determined by the integer-list. For example, decoding unit 160 may comprise a store storing a decoding table mapping integer lists to ring elements. For example, decoding unit 160 may comprise a computation unit to compute the powers and the linear combination thereof.

Many interesting embodiments omit one or both of the encoding and decoding units 160 and 170. For example, calculation device 100 may be configured to receive encoded information over a computer network, say the Internet. The proprietor of the system on which obfuscated calculation device 100 runs, e.g. a computer executing obfuscated calculation software may not know the encoding used for the input information, nor for information outputted by the system 100, e.g., transmitted back over the computer network. Accordingly, even though the calculations are performed in the cloud, the owner of the information has some assurance that his information is safe. Operating on information in encoded form is typically not possible using cryptography, say encryption. Even if a table system is used as outlined in the background this requires dual tables.

Typically, calculation device 100 comprises a microprocessor (not shown) which executes appropriate software stored at device 100; for example, that software may have been downloaded and/or stored in a corresponding memory, e.g., a volatile memory such as RAM or a non-volatile memory such as Flash (not shown). Alternatively, device 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use.

In an embodiment, the electronic calculating device comprises a ring addition circuit and a ring multiplication circuit arranged to execute the function of the corresponding unit. The calculation device may also comprise a negation circuit. The circuit may be integrated circuits, such as CMOS, e.g. obtained by describing the functions in a hardware description language, such as Verilog and VHDL. The circuits may be a processor circuit and storage circuit, the processor circuit executing instructions represented electronically in the storage circuits. The circuits may also be FPGA, ASIC or the like.

The table store 110 and operand store 150 may be implemented as an electronic storage, e.g. a memory. Both stores may be part of the same memory, but they may be distinct memories. Table store 110 may be a non-volatile, non-writable, say a ROM, or Write once read many (WORM) memory. Operand store 150 may be a volatile or non-volatile writable memory, say Flash or RAM.

Figure 2:
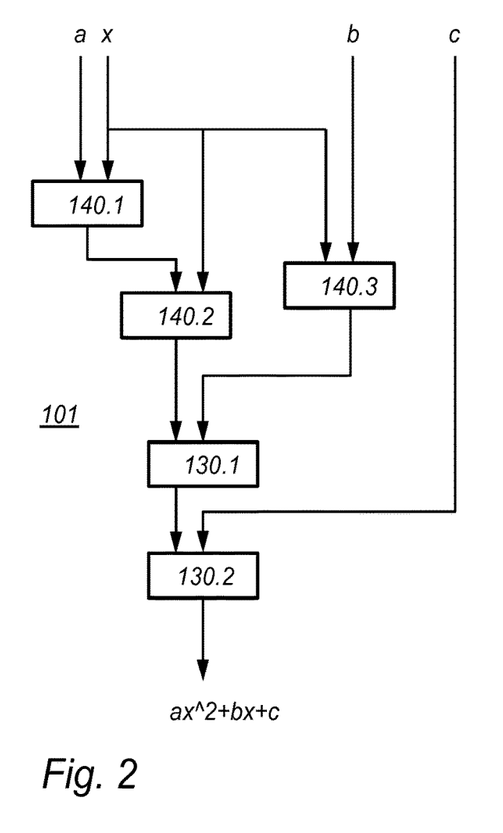

FIG. 2 schematically shows an example of an embodiment of a calculating device 101. Calculation device 101 is a refinement of calculation device 100. In an embodiment, calculation device 101 comprises multiple ring addition unit, multiple ring multiplication units, and optionally, multiple negating units. For example, FIG. 2 shows three multiplication unit, 1401.1, 140.2, and 140.3 and two addition unit 130.1 and 130.2. These units may be of the same design as units 140 and 130 respectively. The multiplication and addition units take relatively little space, e.g., when implemented in software these units need not be more than a few hundred low-level computer instructions. In particular, a copy of the addition and/or multiplication unit may be used for each multiplication or addition that is required in a computer program. This allows traditional obfuscation techniques. As an example, FIG. 2 shows how the polynomial $ax^2+bx+c$ may be computed using obfuscated arithmetic.

The operations of multiple arithmetic units, e.g., addition, multiplication, negation, may be order in any order allowed by their data dependencies. For example, operation 140.3 may be inserted in the ordering 140.1, 140.2., 130.1, and 130.2 at any point before 130.1. Moreover the ordering of subsequent multiplications or additions may be reversed. Thus a diagram like diagram 2 may be translated in a linear ordering for a software program in many ways. It is not needed that the units are strictly separated; instructions for a first unit may be interspersed with instructions for another unit.

Figure 3:
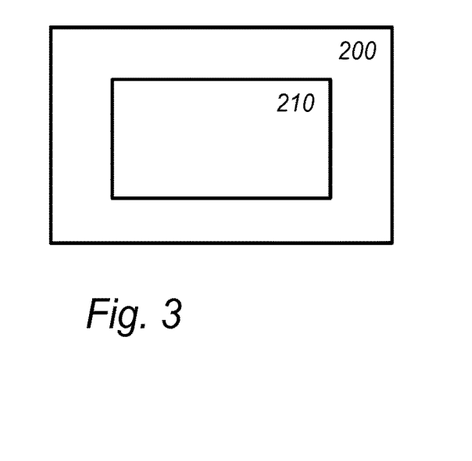

FIG. 3 schematically shows an example of an embodiment of a table computation device 200 for computing an increment table for use in a calculating device. The increment table may be used in a device like calculation device 100. The increment table may be stored on a non-transient storage device, e.g., a hard disk, a non-volatile memory chip etc.

The table computation device 200 comprises a table creation unit 210 arranged to construct the increment table. For example, the table creation unit may be arranged to
  repeatedly select an input ring element, e.g. x,
  determine an output ring element that equals an increment ring element ring added to the input ring element. For example, y=x+1 if the increment value is 1.
  determine an output integer-list encoding for the output ring element. For example, table computation device 200 may comprise an encoding unit like encoding unit 170.
  add an entry to increment table mapping the input ring element to the output integer-list These steps may be performed until all ring elements have been mapped to an integer list. In some embodiments, elements may be skipped, building a partial increment table; e.g., it may be known from the context that certain ring elements will not occur.

Given a ring R, a potential base ring element u, an encoding, say the example encoding, and an integer list length, say 2, a decoding table may be generated as given below. Let k be the order of u.
  generate all integer lists, e.g., by generating all integer lists of the integer list length, and allowing for each position in the list all integers from 0 up to, but not including k. For example, generate: (0,0), (0,1), (1,0), (1,1), (0,2), (1,2), (2,2) (2,0), (2,1), (0,3), . . . etc.
  for each generated integer list compute the ring element encoded by the integer list, and add an entry to the decoding table associating the integer list to the decoding.

Although decoding may or may not use a decoding table such a table is also useful as an encoding table may be generated from a decoding table, e.g., by sorting the table for the ring elements. It may happen that a ring element has multiple encodings. For example the ring element 0 (neutral element for addition) may be represented as (a, a) in the example encoding for any a. Such multiple encodings may be removed from the table, e.g., by deleting all but 1 of the multiple entries for a given ring element; or by leaving the multiple encodings in the table and using the encoding table to encode to a random one of the multiple entries.

Constructing a decoding or encoding table may also be used to find out if a ring element u is a base ring element. If constructing an encoding table fails, because it turns out that some ring elements do not have an encoding, then u is not a base ring element.

Below a number of embodiments of encodings, increment tables, ring addition methods and ring multiplication methods are presented. The negation, addition and multiplication units of calculation device 100 may be configured for any of these embodiments. All examples apply to any commutative ring, in particular $\mathbb{Z}_n$ and $\mathbb{Z}_n[x]/f(x)$. Herein is n a positive integer. Furthermore, it is greatly preferred that any element of the commutative ring may be represented in the chosen encoding. Not all commutative rings allow all elements to be represented in a given encoding, e.g., as a given type of integer list representation. Given a commutative ring R we will say that it allows full homogenous obfuscation if any element in R may be represented as an integer list using a given encoding type. The person skilled in the art can verify if a given commutative ring allows full homogenous obfuscation given an encoding, e.g., by generating all allowable encodings and verifying that together they represent all elements of a given ring. For some applications it may be allowed that the encoding has some gaps. This could have as a consequence that arithmetic cannot be performed on those gaps, at least not using the obfuscated integer list encoding. Specific examples of commutative rings allowing specific types of encodings are presented further below.

Below first a description is given of the example encoding. There are many types of encodings, which have in common that ring elements may be represented as lists of integers. These integers are not ring elements, e.g., even if the ring is not an integer ring say a polynomial ring, then nevertheless elements may be represented as integer lists. The encoding used, how a given integer list maps to a ring element is referred to as the encoding. Typically, the integer lists will always be of the same length, however this is not necessary. Generally, as the encoding allows more types of integer lists, e.g., longer lists, it becomes more likely that a given ring element may be encoded as an integer list in different ways.

Given a commutative ring R with the example encoding, there is a special ring element u, such that any element a of R may be written as $u^{a_1}-u^{a_2}$, for some integers $a_1$ and $a_2$. We refer to such a special ring element as a base ring element. Not all commutative rings may be encoded in this manner, but sufficiently many of them are for the encoding to be useful. The integers $a_1$ and $a_2$ are not themselves ring elements of ring R; they are integers operated upon modulo the order of the base element. Note that that the ring element a equal-s a linear combination of powers of the base element u, namely of $u^{a_1}$ and $u^{a_2}$; in this case the linear combination is obtained by multiplying the powers with +1 or −1 and summing them, more in particular, by subtracting a second power from a first power. The calculating device operates on ring elements encoded in the above fashion. The addition, negation and multiplication units can operate on ring elements in this encoding.

An increment table T plays a central role both in the addition and multiplication operation. The increment table maps an input ring element, in this case an input ring element may be represented as an integer list. For example, given an input integer list $(k_1, k_2)$ representing the input ring element $k=u^{k_1}-u^{k_2}$ the table T maps this to an output integer-list, e.g. $T((k_1, k_2))=(l_1, l_2)$ encoding an output ring element $l=u^{l_1}-u^{l_2}$. The output ring element equals the increment ring element ring-added to the input ring element. In this example, the increment element may be taken as 1, i.e., the ring element which is the identity for the ring multiplication; in this case l=k+1. It is convenient that the table may be applied directly to ring elements which use the same encoding, and thus which may be applied to ring elements having the integer list representation. Nevertheless, there are embodiments, in which the table is applied to ring elements in an alternative encoding. The alternative encoding may also be an integer list, but of an alternative type. Also the increment ring element need not be 1.

Below the operations, negation, addition, and multiplication are described.

Negation. Given a negation-input integer-list $(a_1, a_2)$ representing the negation input ring element $a=u^{a_1}-u^{a_2}$, a negation-output integer-list may be obtained by permuting the integer list, in this case by reversing the order. The negation-output integer-list may be $(a_2, a_1)$. Assuming that there exists an m, such that $u^m=1$, which happens for many rings R, the negation may alternatively be obtained by adding a constant, e.g. m, to each integer of the integer list. In the latter case the negation-output integer-list may be $(a_1+m, a_2+m)$. This works since $-a=u^{a_2}-u^{a_1}=u^{a_1+m}-u^{a_2+m}$. Arithmetic in the integer list is preferably done modulo the order of the base element. Here, an integer of the integer lists corresponds to an exponent of the base element, so integers that are the same module the order of the base element encode the same ring element.

Addition. To add received first addition-input integer-list $(a_1, a_2)$ encoding a first addition-input ring element $a=u^{a_1}-u^{a_2}$ and a second addition-input integer list $(b_1, b_2)$ encoding a second addition-input ring element $b=u^{b_1}-u^{b_2}$ first an intermediate addition integer-list $((c_1, c_2))$ encoding an intermediate addition ring element c is determined.

The ring element c may be the first addition-input ring element a plus the base element u to a power determined from the second addition input integer list, in particular a first integer of the second addition input integer list. In this example, we may have $c=u^{a_1}-u^{a_2}+u^{b_1}$. To compute the latter we observe that $c=u^{a_1}-u^{a_2}+u^{b_1}=(u^{a_1-b_1}-u^{a_2 b_1}+1)u^{b_1}$. The term in brackets may be rewritten in the encoding using the increment table. Through a first application of the increment table to the ring element $u^{a_1 b_1}-u^{a_2-b_1}$ an element $u^{d_1}-u^{d_2}=u^{a_1-b_1}-u^{a_2 b_1}+1$ is obtained. For example, by $T((a_1-b_1, a_2-b_1))=(d_1, d_2)$. We then have that $c_1=d_1+b_1$ and $c_2=d_2+b_1$, thus determining the intermediate addition integer-list $((c_1, c_2))$ may further comprise adding an integer determined from the second addition-input integer-lists to the integers in the integer-list resulting from first application. Adding $u^{b_1}$ to a ring element in integer list representation, in this case, to a, is sometimes referred to as the positive reduction step.

Thus the addition unit has obtained intermediate addition ring element $c=u^{a_1}-u^{a_2}+u^{b_1}=u^{c_1}-u^{c_2}$, as the integer-list $(c_1, c_2)$. The intermediate addition ring element is thus a linear combination of powers of one or more base elements wherein the powers are determined from the first and second addition-input integer-lists. In this case the increment table is applied to the ring-element $u^{a_1-b_1}-u^{a_2-b_1}$ formed by the one or more base ring elements (u) raised to the power of a first integer of the first integer list $(a_1)$ minus a first integer of the second integer list $(b_1)$ minus the base ring element (u)

raised to the power of a second integer of the first integer list ($a_2$) minus the first integer of the second integer list ($b_1$).

In this example, the addition-output integer-list may be determined through a second application of the increment table to ring elements determined from the intermediate addition integer-list and the second addition-input integer-list. This may comprise computing the sum of intermediate addition ring element c and minus the base element raised to a power determined from the second addition input integer list, e.g. the second integer of the second addition input integer list $b_2$: $c-u^{b_2}=u^{c_1}-u^{c_2}-u^{b_2}$. This may be accomplished by negating the intermediate addition ring-element represented by the intermediate addition integer-list before the second application of the increment table. The negating of c may be done as indicated above. As an example we use permuting, but the same operation may be performed by adding a constant to the exponent. After negating, the sum may use plus (instead of minus) the base element raised to a power determined from the second addition input integer list: $-c+u^{b_2}=u^{c_2}-u^{c_i}+u^{b_2}$. The latter operation is of the same type as above, and can be performed through a table application in the same manner as adding $u^{b_1}$. After this the result is negated again. The full addition may use two negations and two table applications, of the same increment table T.

Subtracting $-u^{b_2}$ from a ring element in integer list representation, in this case from c, is sometimes referred to as the negative reduction step. The negative reduction step may be performed by negating, performing the positive reduction step, and negating again.

Multiplication. To multiply the received first multiplication-input integer-list ($r_1$, $r_2$) encoding a first multiplication-input ring element $r=u^{r_1}-u^{r_2}$ and a second multiplication-input integer list (($s_1$, $s_2$)) encoding a second multiplication-input ring element $s=u^{s_1}-u^{s_2}$, a first intermediate multiplication integer-list ($t_1$, $t_2$) and a second intermediate multiplication integer-list ($u_1$, $u_2$) are determined. A multiplication-output integer-list encoding a multiplication-output ring element is determined from the first and second intermediate element. In other embodiments, there may be more than two intermediate multiplication integer lists. We have that $r \cdot s=(u^{r_1}-u^{r_2})(u^{s_1}-u^{s_2})=u^{r_1+s_1}-u^{r_1+s_2}+u^{r_2+s_2}-u^{r_2+s_1}=(u^{r_1+s_1}-u^{r_1+s_2})+(u^{r_2 30 \ s_2}-u^{r_2+s_1})=t+u$. Partitioning the terms in the expanded products over two terms t and u may be done in different ways, e.g., as $(u^{r_1+s_1}-u^{r_2+s_1})+(u^{r_2 30 \ s_2}-u^{r_1+s_2})$.

Thus to multiply two ring elements represented as integer lists they may be transformed into two new integer lists that can be added to obtain the answer to the multiplication. The addition may be done as described above. For example, the multiplication unit may compute the intermediate integer lists and send them to the multiplication unit.

For example, a first integer $t_1$ of the first intermediate multiplication integer-list may comprise a first integer r, of the first multiplication-input integer-list plus a first integer $s_1$ of the second multiplication-input integer-list, and a second integer $t_2$ of the first intermediate multiplication integer-list may comprise a first integer $r_1$ of the first multiplication-input integer-list plus a second integer $s_2$ of the second multiplication-input integer-list $t_1=r_1+s_1$, $t_2=r_1+s_2$; A first integer $u_1$ of the second intermediate multiplication integer-list may comprise a second integer $r_2$ of the first multiplication-input integer-list plus a second integer $s_2$ of the second multiplication-input integer-list, and a second integer $u_2$ of the second intermediate multiplication integer-list may comprise a second integer $r_2$ of the first multiplication-input integer-list plus a first integer $s_1$ of the second multiplication-input integer-list $u_1=r_2+s_2$, $u_2=r_2+s_1$, In an embodiment, e.g., in the example just disclosed, the arithmetic is performed on integer lists, the ring elements do not need to be calculated as ring elements in some natural representation. Now a number of the variants are discussed. Many of the variants are independent, e.g., a variant encoding may be combined with a variant to perform addition.

Through the obfuscated arithmetic when calculations are performed in the integer list, corresponding e.g. to $u^{a_1-b_1}$, etc, the value may be reduced modulo the order of u. For example, if the order of u is 30, all computations may be performed mod 30.

The increment value. The increment value need not be 1. There are at least two ways to use a different increment value. First, the equation $c=u^{a_1}-u^{a_2}+u^{b_1}=(u^{a_1-b_1}-u^{a_2-b_1}+1)u^{b_1}$ may be modified to $c=u^{a_1}-u^{a_2}+u^{b_1}=(u^{a_1-b_1+t}-u^{a_2-b_1+t}+u^t)u^{b_1-t}$. This means that an increment table may be constructed that adds the value $u^t$. This increment table is applied to the same integer lists except an integer t is added. After the first application of the increment table the number $b_1-t$ is added instead of $b_1$.

Another way to change increment value, is to take two elements g and p of R so that repeated addition of g in the ring gives p. For example, there is an integer h such that $h \cdot g=g+\ldots+g=p$. Assume there is an increment table $T_p$ with increment value p, for example, p=1 or $p=u^t$. An increment table $T_g$ may be constructed for g as increment value. The table $T_g$ may be applied h times to obtain the same effect as applying $T_p$ directly. Using different increment tables with different increment values may even be combined in a single embodiment, e.g., to increase obfuscation. The latter construction has the advantage that multiple increment values may be combined without changing the following addition computation.

The construction of the increment table may also be varied. For example, returning to the equation for the intermediate addition ring element, but instead of factoring as $c=_u{}^{a_1}-u^{a_2}+u^{b_1}=(u^{a_1-b_1}-u^{a_2-b_1}+1)u^{b_1}$ the following observation is made $c=_u{}^{a_1}-u^{a_2}+u^{b_1}=(u^{a_1-a_2}+u^{b_1-a_2}-1)u^{a_2}$. Using this formula an increment table can be constructed for the increment value −1. This type of increment table is applied to the ring element $u^{a_1-a_2}+u^{b_1-a_2}$. This ring element does not have the example encoding. The ring element could nevertheless by represented as an integer list, e.g. as ($a_1 -a_2$, $b_1-a_2$), so that this increment table takes an integer list as input and produces an integer list as output. However, different than the previous example, the input integer list has a different encoding than the output encoding. Furthermore, although it is much to be preferred that the encoding used in the input to the addition unit does not have gaps, i.e., that any ring element may be represented in this encoding, there is no need that this alternative input encoding of this increment table does not have gaps; All elements that need to be represented as a table input, can be represented by construction.

After applying the increment table to the ring element $u^{a_1 a-a_2}+u^{b_1-a_2}$, e.g., represented as the integer list ($a_1-a_2$, $b_1-a_2$), the integer $a_2$ is added to both elements of the increment table's output. The result is the intermediate value c as defined above. To perform the second table application, the same construction may be used as above: negating, adding $u^{b_2}$ using this alternative increment table, negating again. Using the construction indicated above, the increment value may be varied from −1 to other values.

Apply the increment table to the ring element $u^{a_1-a_2}+u^{b_1-a_2}$ has a significant advantage, the expression is symmetric thus T ($a_1-a_2$, $b_1-a_2$)=T ($b_1-a_2$, $a_1-a_2$) using the integer list expression as the input value. This in turn allows storing the increment table in compressed form, about half of the table need not be stored. For example, one could only store T(x, y) if x<=y. A slight potential disadvantage of this method is that the intermediate integer list uses a different encoding.

As a further variant the increment table may also apply to $u^{a_2-a_1}-u^{b_1-a_1}$.

The principles illustrated for the example encoding may be applied to number of alternative encodings. A first alternative encoding is to encode a ring element a as integer list $(a_1, a_2)$ using the encoding $a=u^{a_1}+u^{a_2}$. A ring which has a base ring element u such that any ring element may be encoded in this manner, is said to allow positive obfuscated arithmetic. The example encoding will be referred to as negative obfuscated arithmetic. It may be proven mathematically that for any ring that allows positive obfuscated arithmetic with base ring element u there exists an integer m such that $u^m=-1$. Furthermore, a ring that allows negative obfuscated arithmetic allows positive obfuscated arithmetic if and only if such a value m exists. Any ring that allows positive obfuscated arithmetic also allows negative obfuscated arithmetic, though the reverse is not true.

Positive obfuscated arithmetic follows largely the same lines as for negative obfuscated arithmetic, outlined above. Briefly, change of sign of an integer list may be done by adding the value m to all integers in the integer list. Given addition inputs $a=u^{a_1}+u^{a_2}$ and $b=u^{b_1}+u^{b_2}$, the addition may be performed by computing intermediary $c=u^{a_1}+u^{a_2}+u^{b_1}$, e.g. through $(u^{a_1}+u^{a_2-b_1}+1$. The increment table applies to $u^{a_1-b_1}+u^{a_2-b_1}$, with increment value 1. Positive reduction may be applied twice, both for $u^{b_1}$ and $u^{b_2}$, no negative reduction being necessary. This simplifies addition. The construction of the increment table may be varied as indicated above, by factoring a different power of u. The increment value may be varied as indicated above. Positive obfuscated arithmetic has the advantage that the increment table is always symmetric, and may be stored in compressed form. A disadvantage of positive obfuscation, is that fewer ring allows this type of encoding.

The encodings given so far may be optionally multiplied by a constant ring element $w=u^v$ for some v. Thus an integer list $(a_1, a_2)$ may represent the ring element $a=w(u^{a_1}-u^{a_2})$. The negation step is unchanged. The positive reduction step becomes $c=wu^{a_1}-wu^{a_2}+wu^{b_1}=(wu^{a_1}-wu^{a_2-b_1}+w)u^{b_1}$. The increment table may use as increment value w, and is applied to $wu^{a_1-b_1}-wu^{a_2-b_1}$, which has the same encoding type. Negative reduction step may be derived from the positive reduction step as indicated above. The multiplication may multiply $r=wu^{r_1}-wu^{r_2}$ and $s=wu^{s_1}-wu^{s_2}$, represented as integer-lists $(r_1,r_2)$ and integer lists $(s_1,s_2)$ using $r\cdot s=(wu^{r_1}-wu^{r_2})(wu^{s_1}-wu^{s_2})=(wu^{r_1+s_1+v}-wu^{r_1+s_2+v})+(wu^{r_2+s_2+v}-wu^{r_2+s_1+v})=t+u$.

A further alternative encoding is given by $a=u^{a_1}(u^{a_2}-u^{-a_2})$ or multiplied by the constant ½ by $$u^{a_1}\left(\frac{u^{a_2}-u^{-a_2}}{2}\right).$$

One may prove that for a ring that allows negative obfuscated arithmetic with a base ring element u that has an odd order that any ring element x may be written as $$u^{a_1}\left(\frac{u^{a_2}-u^{-a_2}}{2}\right).$$

This changes the encoding, e.g., the map from an integer list to a ring element. If the ring has negative obfuscation it also allows this representation, provided the base ring element has odd order.

The addition and multiplication step can be adapted for the different encodings correspondingly. For example, given a number in encoded form $a=u^{a_1}(u^{a_2}-u^{-a_2})$ one may compute $a'_1$ and $a'_2$ in $a_1$ and $a_2$ so that $a=u^{a'_1}-u^{a'_2}$, e.g. by computing $a_1+a_2$ modulo the order of u and $a_1-a_2$ modulo the order of u Using the latter integers, the addition and multiplications as above may be used.

What we have done to obtain the hyperbolic representation can be generalized to any kind of linear transformation, and the new representation is equivalent if the original one if the transformation can be reversed.

Suppose we have a representation $a=u^{a_1}-u^{a_2}$, and a relation written in matrix form:

$$\begin{pmatrix} a_1 \\ a_2 \end{pmatrix} = \begin{pmatrix} m & n \\ o & p \end{pmatrix} \begin{pmatrix} a_3 \\ a_4 \end{pmatrix}$$

The representation in $a_3$ and $a_4$ is equivalent to the other if the transformation has a determinant mp−no which is a unit in the ring $\mathbb{Z}_k$; k is the order of u in the ring R. this is true if and only if gcd(mp−no, k)=1. The hyperbolic representation is an example (including multiplication with ½) and requires that k is odd because in that case the determinant of the transformation is 2 (or −2).

We are going to explain the method with another example. Consider the ring $\mathbb{Z}_{79}$ and take u=8. This element has order k=13 and we know that all elements in $\mathbb{Z}_{79}$ can be written as a difference $u^{a_1}-u^{a_2}$ for some exponents. Consider the transformation $$M = \begin{pmatrix} 10 & 8 \\ 6 & 4 \end{pmatrix}.$$

The determinant is 5 mod 13, so the matrix has an inverse; which is $$M^{-1} = \begin{pmatrix} 6 & 1 \\ 4 & 2 \end{pmatrix}.$$

We know that for every x in $\mathbb{Z}_{79}$ we can find α and β such that $x=8^\alpha-8^\beta$ but using this transformation we immediately deduce that for all x we can find values γ and δ such that $x=8^{10\gamma+8\delta}-8^{6\gamma+4\delta}$.

This shows that a large class of representations are equivalent. The linear transformations may be generalize to affine transformations if we include two additive constants r, s such that $$\begin{pmatrix} a_1 \\ a_2 \end{pmatrix} = \begin{pmatrix} m & n \\ o & p \end{pmatrix} \begin{pmatrix} a_3 \\ a_4 \end{pmatrix} + \begin{pmatrix} r \\ s \end{pmatrix}$$

This transformation can be reversed if the linear transformation M can be reversed The number of integers in an integer list. In the example discussed so far the number of elements in the integer list was always two. This number has advantages, i.e., it reduces the number of computation steps. On the other hand allowing more elements in the integer list extends the number of rings that allow the obfuscation. The example, below considers three integers per list, but more is possible and works analogously.

Consider the first integer list $(a_1, a_2, a_3)$ and second integer list $(b_1, b_2, b_3)$ encoding the elements $u^{a_1}+u^{a_2}+u^{a_3}$ and $u^{b_1}+u^{b_2}+u^{b_3}$ respectively. Negating may be done by adding a constant m to integers in the list. Addition may be done by applications of the increment table for each integer in the second integer list, in this case three times. The first intermediate addition integer list may be computed from $u^{a_1}+u^{a_2}+u^{a_3}+u^{b_3}=(u^{a_1-b_3}+u^{a_2-b_3}+u^{a_3-b_3}+1)u^{b_3}$. In this case the increment value is 1 and the increment table applies to $u^{a_1-b_3}+u^{a_2-b_3}+u^{a_3-b_3}$. To multiply, the same number of intermediate multiplication integer lists are made as in the second integer list, e.g. :$(a_1+b_1, a_2+b_1, a_3+b_1)$, $(a_1+b_2, a_2+b_2, a_3+b_2)$, $(a_1+b_3, a_2+b_3, a_3+b_3)$.

Multiple different base ring elements. Consider two base elements u and v with exponents such that $u^s=v$ and $v^t=u$. An integer lists $(a_1, a_2)$ encoding the ring element $a=u^{a_1}-v^{a_2}$; similarly for $(b_1, b_2)$. Negation is obtained by mapping $(a_1, a_2)$ to $(sa_2, ta_1)$. The positive reduction step $u^{a_1}-v^{a_2}+u^{b_1}=(u^{a_1-b_1}-v^{a_2-tb_1}+1)u^{b_1}$. The increment value being 1, and the table applying to the integer list $(a_1-b_1, a_2-tb_1)$. Negative reduction may be reduced to positive reduction using negation. Multiplication may be reduced to addition.

Below examples for rings allowing negative and/or positive obfuscation are given.

The ring R may be integer ring $\mathbb{Z}_n$, for a modulus n.

For example, n may be 13 with base ring element u=4. This element has order 6. Below all ring elements 0-6 are encoded as an integer list, using the example encoding. Note that here all element have multiple encodings. For the first encoding listed, a mapping example has been given that demonstrates how given an integer list the corresponding ring element may be found. Ring elements 7-12 may be found be negating the ring elements 1-6.

| Ring element | Integer List | Mapping example |
|---|---|---|
| 0 | (x, x) for any 0 <= x < 6 | $4^x-4^x$ |
| 1 | (1, 2), (5, 4) | $4^1-4^2$ |
| 2 | (0, 3), (2, 0), (3, 5) | $4^0-4^3$ |
| 3 | (1, 0), (3, 4) | $4^1-4^0$ |
| 4 | (0, 5), (2, 3) | $4^0-4^5$ |
| 5 | (0, 4), (1, 3), (4, 1) | $4^0-4^4$ |
| 6 | (2, 5), (4, 2), (5, 1) | $4^2-4^5$ |

This example also allows positive obfuscation, as $4^3=-1$ in this ring. Other values for n and u that allow negative obfuscation are: n=151, u=2; n=87, u=20; n=79; u=8, etc.

The inventors have found a large number of examples of rings that allow negative and/or positive encodings. Note many variants are derivable from a given negative and/or positive encodings, as described herein.

The ring R may be a polynomial ring $\mathbb{Z}_n[x]/f(x)$, for a polynomial f and a modulus n. The polynomial does not need to be irreducible. If f is not irreducible, we get a commutative ring that is not a field. It turns out that any commutative polynomial ring R allows obfuscation.

For example, a number of fields are given
Field $F(2^6)$
This field is isomorphic to $F2[x]/(x^6+x^4+x^3+x+1)$. The base $u=x^3$ has order 21.
Field $F(2^8)$
This field is isomorphic to $F2[x]/(x^8+x^4+x^3+x^2+1)$.
The base $u=x^3$ has order 85.
The base $u=x+1$ has order 51.

Field $F(2^{10})$
This field is isomorphic to $F2[x]/(x^{10}+x^6+x^5+x^3+x^2+x+1)$.
The base $u=x^3$ has order 341.
The base $u=x^7+x^6+x^4+x^3+x^2+x$ has order 93.
Field $F(2^{12})$
This field is isomorphic to $F2[x]/(x^{12}+x^7+x^6+x^5+x^3+x+1)$.
The base $u=x^3$ has order 1365.
The base $u=x^5$ has order 819.
The base $u=x^7$ has order 585.
The base $u=x^9$ has order 455.
The base $u=x^8+x^7+x^6+x^4+x^2+x$ has order 315.
The base $u=x^{10}+x^9+x^8+x^6+x^4+x^3$ has order 273.
The base $u=x^{11}+x^{10}+x^7+x^5+x^3+x^2+x+1$ has order 195.

Figure 4:
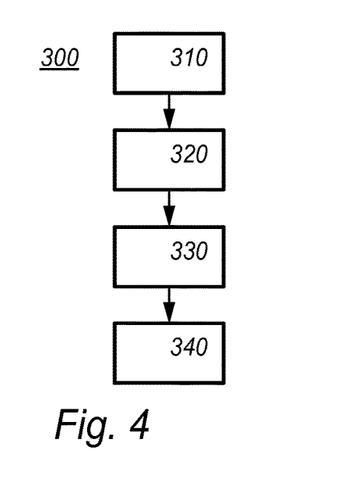

FIG. 4 schematically shows an example of an embodiment of a calculating method 300 for performing obfuscated arithmetic in a commutative ring (e.g. $\mathbb{Z}_n$; $\mathbb{Z}_n[4]/f(x)$), the ring has a finite number of ring elements, a ring-addition and a ring-multiplication being defined on the ring elements, the calculating method operating on integer-lists $((a_1, a_2))$ encoding ring elements $(u^{a_1}-u^{a_2})$, the integer-lists comprising at least two integers. The calculating method comprises
 storing an increment table (T) defined for an increment ring element $(1; u^t)$, the increment table mapping an input ring element $(k=u^{k_1}-u^{k_2})$ to an output integer-list $(T((k_1,k_2))=(l_1, l_2))$ encoding an output ring element $(l=u^{l_1}-u^{l_2})$, such that the output ring element equals the increment ring element ring-added to the input ring element (l=k+1),
 ring adding, the ring adding comprising
  receiving 310 a first addition-input integer-list $((a_1, a_2))$ encoding a first addition-input ring element and a second addition-input integer list $((b_1, b_2))$ encoding a second addition-input ring element,
  determining 320 an addition-output integer-list encoding an addition-output ring element by applying the increment table to ring elements determined from the first and second addition-input integer-lists, the addition-output ring element being equal to the ring-addition of the first addition-input ring element and the second addition-input ring element,
 a ring multiplying, the ring multiplying comprising
  receiving 330 a first multiplication-input integer-list $((r_1, r_2))$ encoding a first multiplication-input ring element and a second multiplication-input integer list $((s_1, s_2))$ encoding a second multiplication-input ring element,
  determining 340 a multiplication-output integer-list encoding a multiplication-output ring element by applying the increment table to ring elements determined from the first and second multiplication-input integer-lists, the multiplication-output ring element being equal to the ring-multiplication of the first multiplication-input ring element and the second multiplication-input ring element.

Figure 5:
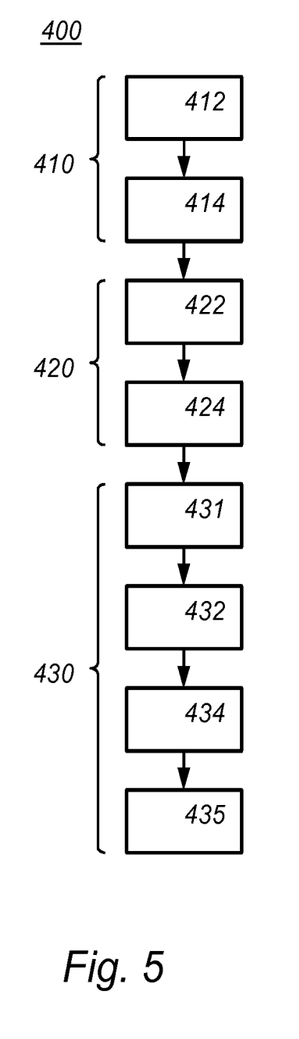

FIG. 5 schematically shows an example of an embodiment of an addition method 400, which may be used in device 100, or in method 300 etc. This example uses the example encoding. The method may be adapted to other encodings. All the variants described herein may be applied; this example uses increment value 1 and the increment table is constructed by factoring out $u^{b_1}$.

Method 400 comprises receiving addition operands 410. This may comprise receiving 410 a first addition input integer list, e.g., $(a_1, a_2)$ and receiving 420 a second addition input integer list, e.g., $(b_1, b_2)$.

Method 400 further comprises determining 420 an intermediate addition integer-list, e.g. $(c_1, c_2)$. For example, this may comprise applying the increment table to a ring element determined from the first and second addition-input integer-lists. In particular, the increment table may be applied to an integer list, the elements in the integer being derived from the elements in the input integer lists.

For example, determining 420 may comprise applying 422 the increment table to $(a_1-b_1, a_2-b_1)$, e.g. obtaining $(d_1, d_2)$; and adding 424 the integer $b_1$ determined from second addition-input integer-lists to the integers in the integer-list resulting from first application, e.g., $(c_1, c_2)=(d_1+b_1, d_2+b_1)$.

Method 400 further comprises determining 430 the addition-output integer-list through a second application of the increment table to a ring element determined from the intermediate addition integer-list and the second addition-input integer-list. For longer integer lists this may involve additional increment table applications. For example, this may comprise negating 431 the intermediate addition integer-list, e.g., permuting to $(c_2, c_1)$. Applying the 432 the increment table, and adding 434 are the same as applying 422 and adding 424 except that the addition input integer lists $(a_1, a_2)$ is replaced by the intermediate integer list $(c_2, c_1)$ and $b_1$ by $b_2$. Finally the result of 434 is negated 453 to obtain the result of the obfuscated addition.

If instead of negative obfuscation, as here, positive obfuscation is used, then negating 431, 435 may be omitted.

Figure 6:
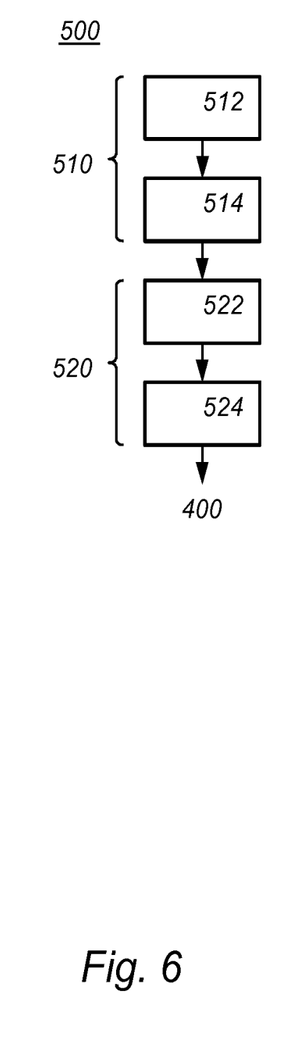

FIG. 6 schematically shows an example of an embodiment of a multiplication method 500, which may be used in device 100, or in method 300 etc. This example uses the same encodings and increment tables as method 400.

Method 500 comprises receiving multiplication operands 510. This may comprise receiving 510 a first multiplication-input integer-list, e.g. $(r_1, r_2)$, and receiving 514 a second multiplication-input integer list $(s_1, s_2)$.

Method 500 further comprises determining 520 a first and second intermediate multiplication integer-list. For example, 520 may comprise determining 522 a first intermediate multiplication integer-list and determining 524 a second intermediate multiplication integer-list. These may for example, be chosen as $(s_1+r_1, s_1+r_2)$ and $(s_2+r_2, s_2+r_1)$, respectively, although there are other choices. The multiplication continues by adding these numbers in the addition method 400.

Note that the table is only used in applying 422 and applying 432 and nowhere else in methods 400 and 500. Both addition and multiplication use the same table, and both use the table the same number of times (2). The other operations comprise small arithmetic operations on the integers in the integer list, e.g., modulo the order of the base ring element.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to an embodiment may be executed using software, which comprises instructions for causing a processor system to perform any one of methods 300, 400 and 500. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method may be executed using a bitstream arranged to configure programmable logic, e.g., a field-programmable gate array (FPGA), to perform the method.

It will be appreciated that an embodiment also extends to computer programs, particularly computer programs on or in a carrier, adapted for putting an embodiment into practice. The program may be in the form of source code, object code, a code intermediate source and object code such as partially compiled form, or in any other form suitable for use in the implementation of the method according to an embodiment. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
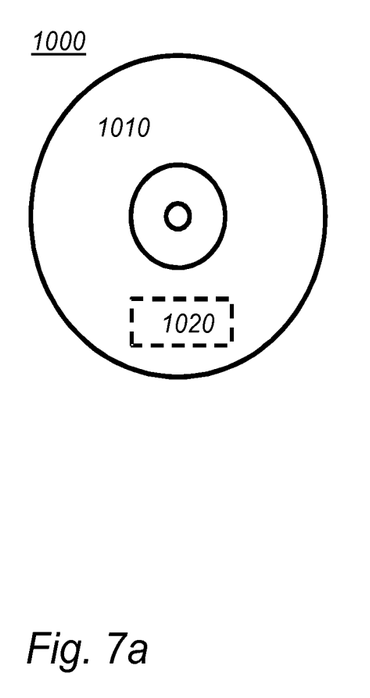
FIG. 7a shows a computer readable medium having a writable part comprising a computer program according to an embodiment.

FIG. 7a shows a computer readable medium 1000 having a writable part 1010 comprising a computer program 1020, the computer program 1020 comprising instructions for causing a processor system to perform a calculating method for performing obfuscated arithmetic according to an embodiment. The writable part may be arranged for multiple writing, or for writing once only. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said calculating method for performing obfuscated arithmetic.

A computer readable medium, e.g., computer readable medium 1000, may comprise an increment table, and/or a decoding table, and/or an encoding table.

Figure 7B:
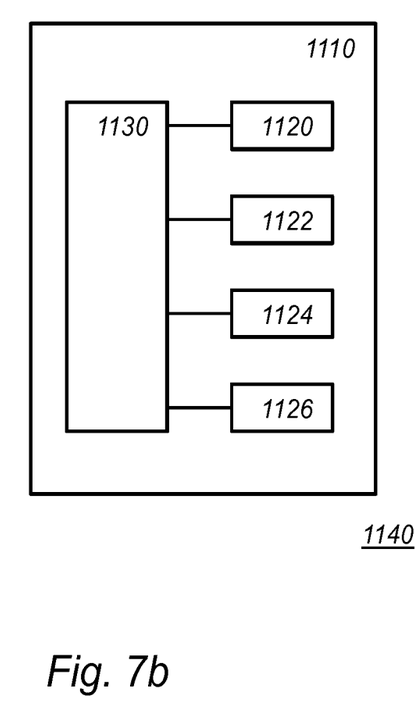
FIG. 7b shows a schematic representation of a processor system according to an embodiment.

FIG. 7b shows a schematic representation of a processor system 1100 according to an embodiment. The processor system comprises one or more integrated circuits 1110. The architecture of the one or more integrated circuits 1110 is schematically shown in FIG. 7b. Circuit 1110 comprises a processing unit 1120, e.g. a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references are not exhaustive and shall not be construed as limiting the claim.

LIST OF REFERENCE NUMERALS IN FIG. 1

100 a calculating device
110 a storage arranged to store an increment table
120 a ring negating unit
130 a ring addition unit
140 a ring multiplication unit
150 an operand store
160 a decoding unit
170 an encoding unit
172 a storage arranged to store an encoding table

The invention claimed is:

1. An electronic calculating device for performing obfuscated arithmetic in a commutative ring having a finite number of ring elements, a ring-addition and a ring-multiplication being defined on the ring elements, the calculating device operating on integer-lists encoding the ring elements, the integer-lists comprising at least two integers, wherein an integer-list encodes a ring element such that the ring element equals a linear combination of powers of one or more base ring elements, wherein the powers have exponents determined by the integer-list, the calculating device comprising:
a storage configured to store an increment table defined for a fixed increment ring element,
the increment table mapping an input ring element to an output integer-list encoding an output ring element, such that the output ring element equals the fixed increment ring element ring-added to the input ring element,
a ring addition unit configured to:
receive a first addition-input integer-list encoding a first addition-input ring element and a second addition-input integer list encoding a second addition-input ring element, the fixed increment ring element being independent from the first and second addition-input ring element, and
determine an addition-output integer-list encoding an addition-output ring element by applying the increment table to ring elements determined from the first and second addition-input integer-lists, the addition-output ring element being equal to the ring-addition of the first addition-input ring element and the second addition-input ring element,
wherein the ring addition unit is configured to determine the addition-output integer-list by:
determining an intermediate addition integer-list encoding an intermediate addition ring element by a first application of the increment table to a ring element being a linear combination of base powers of one or more base elements, wherein the base powers are determined from the first and second addition-input integer-lists,
determining the addition-output integer-list comprising a second application of the increment table to ring elements determined from the intermediate addition integer-list and determined from the second addition-input integer-list.

2. The calculating device as in claim 1, comprising:
a ring multiplication unit configured to
receive a first multiplication-input integer-list encoding a first multiplication-input ring element and a second multiplication-input integer list encoding a second multiplication-input ring element, and
determine a multiplication-output integer-list encoding a multiplication-output ring element by applying the increment table to ring elements determined from the first and second multiplication-input integer-lists, the multiplication-output ring element being equal to the ring-multiplication of the first multiplication-input ring element and the second multiplication-input ring element.

3. The calculation device as in claim 2, wherein the ring multiplication unit determines the multiplication-output integer-list by:
determining from the first and second multiplication-input integer-lists a first intermediate multiplication integer-list and a second intermediate multiplication integer-list, encoding a first and second intermediate multiplication ring element respectively, and
adding the first and second intermediate multiplication integer-list through the ring addition unit.

4. The calculation device as in claim 3, wherein
a first integer of the first intermediate multiplication integer-list comprises a first integer of the first multiplication-input integer-list plus a first integer of the second multiplication-input integer-list, and
a second integer of the first intermediate multiplication integer-list comprises a first integer of the first multiplication-input integer-list plus a second integer of the second multiplication-input integer-list, and
a first integer of the second intermediate multiplication integer-list
comprises a second integer of the first multiplication-input integer-list plus a second integer of the second multiplication-input integer-list, and
a second integer of the second intermediate multiplication integer-list comprises a second integer of the first multiplication-input integer-list plus a first integer of the second multiplication-input integer-list.

5. The calculating device as in claim 1, wherein the integer-list encodes a ring element such that
the ring element equals a base element raised to a power determined by a first integer of the integer list minus the base element raised to a power determined by a second integer of the integer list, optionally multiplied by a constant, or
the ring element equals the base element raised to a power determined by a first integer of the integer list plus the base element raised to a power determined by a second integer of the integer list, optionally multiplied by a constant, or the ring element equals the base element raised to a power determined by a first integer of the integer list times a result of the base element raised to a power determined by a second integer of the integer list minus the base element raised to a power determined by minus the second integer of the integer list, optionally multiplied by a constant, or the ring element equals the base element raised to a power which is a first linear combination of a first integer and a second integer of the integer list plus or minus the base element raised to a power which is a second linear combination of the first integer and the second integer of the integer list given a matrix so that the matrix is optionally multiplied by a constant.

6. The calculation device as in claim 1, wherein the determining the intermediate addition integer-list further comprises adding an integer determined from the first and second addition-input integer-lists to the integers in the integer-list resulting from the first application.

7. The calculation device as in claim 6, wherein the increment table is applied to the ring element formed by the one or more base ring elements raised to the power of a first integer of the first integer list minus a first integer of the second integer list plus or minus a base ring element raised to the power of a second integer of the first integer list minus the first integer of the second integer list;

the increment table is applied to the ring element formed by the one or more base ring elements raised to the power of a first integer of the first integer list minus a second integer of the first integer list plus or minus a base ring element raised to the power of a first integer of the second integer list minus the second integer of the first integer list;

the increment table is applied to the ring-element formed by the one or more base ring raised to the power of a second integer of the first integer list minus a first integer of the first integer list plus or minus a base ring element raised to the power of a first integer of the second integer list minus the first integer of the first integer list.

8. The calculation device as in claim 6, wherein the intermediate addition ring-element represented by the intermediate addition integer-list is negated before the second application of the increment table.

9. The calculation device as in claim 1, wherein a ring element represented by an integer list is negated by permuting the integer list, and/or a ring element represented by an integer list is negated by adding a constant to each integer of the integer list, and/or a ring element represented by an integer list is negated by permuting the integer list and multiplying one or more integers of the integer list with a constant.

10. The calculation device as in claim 1 wherein the increment table takes as input an input integer-lists representing the input ring element.

11. The calculation device as in claim 1, wherein the commutative ring is a ring formed by the integers modulo an integer modulus, or the commutative ring is a ring formed by the integer polynomials modulo an integer polynomial modulus.

12. A ring encoding device, the ring encoding device comprising:

a first storage configured to store an encoding table defined for one or more base ring elements, and at least one encoding table configured to map a ring element to an integer-list such that the ring element equals a linear combination of powers of the one or more base ring elements, wherein the powers have exponents determined by the integer-list, the ring encoding device being configured to encode a ring element of a commutative ring as the integer-list, communicatively coupled to a calculation device configured to receive encoded information over a computer network, the calculation device being configured to perform obfuscated arithmetic in the commutative ring, the commutative ring having a finite number of ring elements, a ring-addition and a ring-multiplication being defined on the ring elements, the calculating device operating on integer-lists encoding the ring elements defined by the at least one encoding table, the integer-lists comprising at least two integers, the calculating device comprising:

a second storage configured to store an increment table defined for a fixed increment ring element, the increment table mapping an input ring element to an output integer-list encoding an output ring element, such that the output ring element equals the fixed increment ring element ring-added to the input ring element, a ring addition unit configured to:

receive a first addition-input integer-list encoding a first addition-input ring element and a second addition-input integer list encoding a second addition-input ring element, the fixed increment ring element being independent from the first and second addition-input ring element, and determine an addition-output integer-list encoding an addition-output ring element by applying the increment table to ring elements determined from the first and second addition-input integer-lists, the addition-output ring element being equal to the ring-addition of the first addition-input ring element and the second addition-input ring element, wherein the ring addition unit is configured to determine the addition-output integer-list by:

determining an intermediate addition integer-list encoding an intermediate addition ring element by a first application of the increment table to a ring element being a linear combination of base powers of one or more base elements, wherein the base powers are determined from the first and second addition-input integer-lists, determining the addition-output integer-lists comprising a second application of the increment table to ring elements determined from the intermediate addition integer-list and determined from the second addition-input integer-list.

13. A ring decoding device, the ring decoding device being configured to decode an integer-list to a ring element of a commutative ring, communicatively coupled to a calculation device configured to receive encoded information over a computer network, the calculation device being configured to perform obfuscated arithmetic in the commutative ring, the commutative ring having a finite number of ring elements, a ring-addition and a ring-multiplication being defined on the ring elements, the calculating device operating on integer-lists encoding ring elements, the integer-lists comprising at least two integers, wherein an integer-list encodes a ring element such that the ring element equals a linear combination of powers of the one or more base ring elements, wherein the powers have exponents determined by the integer-list, the calculating device comprising:

a storage configured to store an increment table defined for a fixed increment ring element, the increment table mapping an input ring element to an output integer-list encoding an output ring element, such that the output ring element equals the fixed increment ring element ring-added to the input ring element, a ring addition unit configured to:

receive a first addition-input integer-list encoding a first addition-input ring element and a second addition-input integer list encoding a second addition-input ring element, the fixed increment ring element being independent from the first and second addition-input ring element, and determine an addition-output integer-list encoding an addition-output ring element by applying the increment table to ring elements determined from the first and second addition-input integer-lists, the addition-output ring element being equal to the ring-addition of the first addition-input ring element and the second addition-input ring element, wherein the ring addition unit is configured to determine the addition-output integer-list by:

determining an intermediate addition integer-list encoding an intermediate addition ring element by a first application of the increment table to a ring element being a linear combination of powers of one or more base elements, wherein the powers are determined from the first and second addition-input integer-lists, determining the addition-output integer-lists comprising a second application of the increment table to ring elements determined from the intermediate addition integer-list and determined from the second addition-input integer-list, the ring decoding device being configured to determine for the one or more base ring element, the ring element such that the ring element equals the linear combination of the powers of the one or more base ring element.

14. A table computation device for computing an increment table for use in a calculating device for performing obfuscated arithmetic in a commutative ring, the commutative ring having a finite number of ring elements, a ring-addition and a ring-multiplication being defined on the ring elements, the calculating device operating on integer-lists encoding the ring elements, the integer-lists comprising at least two integers, the table computation device comprising:

a table creation unit arranged to construct the increment table, the table creation unit being configured to:

repeatedly select an input ring element, determine an output ring element that equals a fixed increment ring element ring-added to the input ring element, determine an output integer-list encoding for the output ring element, and add an entry to the increment table mapping the input ring element to the output integer-list, the table computation device being arranged to store the increment table in the calculating device.

15. An electronic calculating method for performing obfuscated arithmetic in a commutative ring, the ring having a finite number of ring elements, a ring-addition and a ring-multiplication being defined on the ring elements, the calculating method operating on integer-lists encoding ring elements, the integer-lists comprising at least two integers, wherein an integer-list encodes a ring element such that the ring element equals a linear combination of powers of one or more base ring elements, wherein the powers have exponents determined by the integer-list, the calculating method comprising acts of:

storing in a memory an increment table defined for a fixed increment ring element, the increment table mapping an input ring element to an output integer-list encoding an output ring element, such that the output ring element equals the fixed increment ring element ring-added to the input ring element, ring adding by a ring addition unit of a calculating device, the ring adding act comprising acts of:

receiving a first addition-input integer-list encoding a first addition-input ring element and a second addition-input integer list encoding a second addition-input ring element, determining an addition-output integer-list encoding an addition-output ring element by applying the increment table to ring elements determined from the first and second addition-input integer-lists, the addition-output ring element being equal to the ring-addition of the first addition-input ring element and the second addition-input ring element, wherein determining the addition-output integer-list comprises acts of:

determining an intermediate addition integer-list encoding an intermediate addition ring element by a first application of the increment table to a ring element being a linear combination of powers of one or more base elements, wherein the powers are determined from the first and second addition-input integer-lists, and determining the addition-output integer-list comprising a second application of the increment table to ring elements determined from the intermediate addition integer-list and determined from the second addition-input integer-list.

16. The electronic calculating method as in claim 15, further comprising an act of ring multiplying by the ring addition unit, the ring multiplying act comprising acts of:

receiving a first multiplication-input integer-list encoding a first multiplication-input ring element and a second multiplication-input integer list encoding a second multiplication-input ring element, and determining a multiplication-output integer-list encoding a multiplication-output ring element by applying the increment table to ring elements determined from the first and second multiplication-input integer-lists, the multiplication-output ring element being equal to the ring-multiplication of the first multiplication-input ring element and the second multiplication-input ring element.

17. A non-transitory computer readable medium comprising computer instructions which, when executed by a processor, configure the processor to perform the method of claim 15.

* * * * *